United States Patent Office 2,741,583
Patented Apr. 10, 1956

2,741,583

INHIBITION OF POLYMERIZATION DURING THE PURIFICATION OF ACRYLATES BY DISTILLATION

Mervyn Francis Vaughan, Cheam, and Frederick James Bellringer, Wimbledon, London, England, assignors to The Distillers Company Limited, Edinburgh, Scotland, a British company No Drawing. Application November 12, 1953, Serial No. 391,764

Claims priority, application Great Britain November 20, 1952

10 Claims. (Cl. 202—39.5)

The present invention relates to the purification of acrylates, and more particularly to the inhibition of polymerisation in the vaporised and condensed ester during the distillation of methyl or ethyl acrylates or the corresponding alpha-alkyl acrylates.

In the majority of processes for the preparation of such esters, the final stage in the purification of the ester consists in a distillation, which is usually an extractive distillation with water in order to separate it from accompanying alcohol. If no polymerisation inhibitor is used, the distillation column becomes fouled by the deposition of polymer, and the distilled ester itself also shows a tendency to polymerise. The addition of polymerisation inhibitors, for example hydroquinone, to the liquid esters is well known, but such substances are not effective in preventing polymerisation of the vaporised ester in the distillation column. For the latter purpose it has been suggested to use nitric oxide as an inhibitor, but the generation of this gas is expensive and involves the use of a separate generator.

It is an object of the present invention to provide an improved process for the distillation of acrylates which does not involve the use of expensive means for generating nitric oxide but which can be carried out effectively without appreciable polymer formation in the distillation column.

It has now been discovered that a metallic nitrite, such as sodium nitrite, or a mixture of nitrogen oxides as obtained by the action of an acid on such a nitrite, can be used to reduce the polymerisation which takes place in the still, but that the distillate so produced undergoes extremely rapid polymerisation. It has been found however that this rapid polymerisation can be prevented under certain circumstances.

Accordingly, the process for the distillation of monomeric methyl or ethyl acrylate or the corresponding alpha-alkyl substituted acrylates comprises subjecting the ester to distillation in the presence of nitrogen oxides and/or a metallic nitrite, as hereinafter defined, and treating the distillate to remove free nitrogen dioxide if present.

The expression "mono-ethylenically unsaturated carboxylic acid with from 3 to 5 carbon atoms in the molecule wherein the double bond is in the alpha-beta position and the beta carbon atom carries two hydrogen atoms, with an alkanol of not more than 2 carbon atoms" as used in the claims is intended to designate methyl or ethyl acrylate or the corresponding alpha alkyl substituted acrylates. The claims specify that the acid from which the esters are derived should have from 3 to 5 carbon atoms, which means that the acid can be acrylic or a methyl or ethyl substituted acrylic acid.

By the term "nitrogen oxides" we mean those oxides of nitrogen which are produced by the action of mineral acids such as sulphuric and hydrochloric acids, on metallic nitrites in the absence of reducing or oxidising agents, and by the term "metallic nitrites" we mean the nitrites of the alkali metals such as sodium, lithium and potassium nitrites, and of the alkaline earth metals such as barium, calcium and strontium nitrites.

If a metallic nitrite is used as the inhibitor in the still, water must be introduced into the still containing the nitrite in solution, but the free nitrogen oxides, on the other hand, may be introduced to the distillation column in the gaseous phase. The concentration of the inhibitor used may vary within wide limits. In a preferred embodiment of the invention sodium nitrite is used as the inhibitor in a water-extractive distillation of the ester. At least 0.01%, preferably at least 0.1%, by weight of nitrite in the water should be used. Such a solution, on boiling evolves traces of nitrogen oxides, but it is not certain that this is the sole reason for the inhibitory effect of the nitrite. In a non-extractive distillation, it is necessary to introduce the metallic nitrite dissolved in a smaller quantity of water as a more concentrated solution. If nitrogen oxides generated externally, on the other hand, are used, somewhat smaller amounts based on the amount of the feed to the still may be effective.

The distillation, whether extractive or not, may be carried out in the conventional manner at atmospheric pressure, the object of the former being to separate methanol or ethanol and other materials from the ester. The distilled ester is freed from at least the nitrogen dioxide for instance by washing with agents which will remove the nitrogen dioxide such as a dilute aqueous alkali metal sulphite or carbonate solution, or by volatilising it, for instance by blowing the ester with an inert gas or by a vacuum treatment. In a further important embodiment of the invention, however, the distillation is carried out under reduced pressure, of not more than about 500 millimetres of mercury, for instance under a pressure of from 200 to 500 millimetres of mercury. Under these conditions the distillate is found to be substantially free from nitrogen oxides, so that no separate treatment step is necessary, whilst the reduction in the temperature of the column helps to reduce thermal polymerisation. The addition of further inhibitor is not essential, but if required a combination of both methods of obtaining a nitrogen dioxide-free distillate may be practised, the ester resulting from an extractive distillation carried out under reduced pressure being subjected to a further treatment, for instance with aqueous sodium sulphite, in order to remove the last traces of nitrous acid.

The distilled ester may also be treated to remove free nitrogen dioxide by the addition of a phenolic compound, preferably a phenolic polymerisation inhibitor such as hydroquinone or pyrogallol. Such compounds react with the nitrogen dioxide forming coloured reaction products.

The distilled esters produced in accordance with the invention are free from polymer and, even when no polymerisation inhibitor has been added, do not show an undue tendency to polymerise at room temperature. However, if the product is to be stored, it may be stabilised by the addition of the usual inhibitors, for instance hydroquinone.

The following examples show how the process of the invention may be carried out in practice:

*Example 1*

A solution containing approximately 50% by weight methyl acrylate, together with methanol and methyl methoxypropionate was vaporised and fed into a fractionating column 66 inches long x 2 inches diameter packed with stainless steel gauze packing rings. An aqueous solution of sodium nitrite (3 gms./litre) adjusted to pH 6.0 with sulphuric acid was preheated to 71° C. and fed to the top of the column, which was operated at normal pressure. The distillate was decanted, the lower aqueous layer being returned to the column and the oil layer removed. The product leaving the decanter was free from polymer, but a portion of the distillate on standing in the receiver warmed up spontaneously and the unsaturation value dropped quickly.

The distilled ester was then fed directly to a washing column where it was washed in countercurrent with a solution containing 10 gms./litre of sodium sulphite and 200 gms./litre of sodium chloride. The oil from the washing column did not undergo any alteration in its unsaturation value on standing for some hours, but for storage purposes hydroquinone was finally added.

The still ran for a total of 600 hours, without any signs of polymer being formed.

An ester of similar characteristics was obtained when the sulphite solution was replaced by a solution containing 1% sodium carbonate and 0.1% hydroquinone.

A sample of the above material was polymerised in the following manner:

The hydroquinone was removed by shaking with saturated brine solution containing 0.5% sodium hydroxide followed by washing twice with water. The sample was dried with anhydrous sodium sulphate and polymerised by heating at 75° C. in the presence of 0.1% by weight cumene hydroperoxide, giving a normal polymerisation rate and a satisfactory polymer.

Example 2

A feed containing approximately 50% by weight methyl acrylate together with methanol and methyl methoxypropionate was fed at a rate of ca. 2 gallons per hour into a 40 plate bubble-cap column 6 ins. diameter of stainless steel. A solution of sodium nitrite (3 gms./litre) adjusted to pH 6.0 was fed to the top of the column at the rate of 12 gals./hr., and at a temperature of ca. 44° C. The pressure at the head of the column was 250 mm. Hg and at the kettle 332 mm. The distillate temperature was 44° C., and the decanted methyl acrylate layer contained less than 0.5% by weight methanol and approximately 0.01% by weight nitrous acid. This methyl acrylate was found to be stable. For the purposes of storage, however, 0.1% hydroquinone was finally added to the ester.

The still ran under approximately the above conditions for a period of over 420 hours without any serious polymerisation occurring in the still or in the distillate.

Example 3

When the procedure outlined in Example 1 is repeated, but replacing the aqueous sodium nitrite solution by a solution of any one of the alkaline earth metal nitrites hereinbefore enumerated, essentially the same results are obtained.

These same results are obtained if, instead of sodium nitrite, any one of the other alkali metal nitrites, hereinbefore enumerated, is employed.

Example 4

When the procedure outlined in Example 1 is repeated with the exception that the aqueous sodium nitrite solution is replaced by water, and a gaseous mixture of nitrogen oxides, from the reaction between sodium nitrite and dilute sulphuric acid, is fed into the column, substantially the same results are again obtained.

We claim:

1. A process for the distillation of monomeric esters of a mono-ethylenically unsaturated carboxylic acid with from 3 to 5 carbon atoms in the molecule wherein the double bond is in the alpha-beta position and the beta carbon atom carries two hydrogen atoms, with an alkanol of not more than 2 carbon atoms, which comprises subjecting the ester to distillation in the presence of a mixture of oxides of nitrogen as obtained by the action of a mineral acid on a metallic nitrite, and treating the distillate to remove free nitrogen dioxide.

2. A process for the distillation of monomeric esters of a mono-ethylenically unsaturated carboxylic acid with from 3 to 5 carbon atoms in the molecule wherein the double bond is in the alpha-beta position and the beta carbon atom carries two hydrogen atoms, with an alkanol of not more than 2 carbon atoms, which comprises subjecting the ester to distillation in the presence of a mixture of oxides of nitrogen as obtained by the action of a mineral acid on a metallic nitrite, to inhibit polymerisation of the ester.

3. A process according to claim 2, wherein the distillation is carried out in the presence of an aqueous solution of an alkali metal nitrite.

4. A process according to claim 2, wherein the distillation is carried out in the presence of an aqueous solution of an alkaline earth metal nitrite.

5. A process according to claim 3, wherein the amount of water in the aqueous alkali metal nitrite solution is sufficient to carry out an extractive distillation of the ester.

6. A process according to claim 5, wherein the feed contains at least 0.1% by weight of the metallic nitrite.

7. A process according to claim 4, wherein the amount of water in the aqueous alkaline earth metal nitrite solution is sufficient to carry out an extractive distillation of the ester.

8. A process according to claim 2, wherein the distillation is carried out at atmospheric pressure.

9. A process according to claim 2, wherein the distillation is carried out under a pressure of not more than about 500 mm. of mercury whereby the distillate is obtained substantially free from nitrogen dioxide.

10. A process according to claim 1, wherein the removal of free nitrogen dioxide is carried out by adding a phenolic polymerisation inhibitor to the distillate.

References Cited in the file of this patent
UNITED STATES PATENTS

| | | |
|---|---|---|
| 2,171,795 | Kautter | Sept. 5, 1939 |
| 2,341,282 | Marks | Feb. 8, 1944 |
| 2,416,756 | Julk | Mar. 4, 1947 |
| 2,613,175 | Johnstone et al. | Oct. 7, 1952 |
| 2,607,081 | Taylor | Aug. 19, 1952 |
| 2,649,475 | Bellringer et al. | Aug. 18, 1953 |
| 2,671,052 | Mitchell et al. | Mar. 2, 1954 |

OTHER REFERENCES

Briscoe: "General Chemistry for Colleges," published by Houghton Mifflin Co., 1938, p. 566.

Kharasch et al.: "Inhibition of Polymerization," Industrial and Engineering Chemistry, vol. 39, pp. 830–837.

Johnson et al.: "Monomer Recovery in GR–S Manufacture," Chemical Engineering Progress, vol. 45, No. 6, pp. 407–414 (June 1949).